US012412507B2

(12) United States Patent
Kang et al.

(10) Patent No.: US 12,412,507 B2
(45) Date of Patent: Sep. 9, 2025

(54) DISPLAY DEVICE, DRIVING METHOD THEREOF, AND ELECTRONIC DEVICE

(71) Applicant: Samsung Display Co., Ltd., Yongin-Si (KR)

(72) Inventors: Keun Oh Kang, Yongin-si (KR); Dae Sik Lee, Yongin-si (KR); Si Duk Sung, Yongin-si (KR); Sang Hyun Lee, Yongin-si (KR); Song Yi Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 4 days.

(21) Appl. No.: 18/111,887

(22) Filed: Feb. 21, 2023

(65) Prior Publication Data

US 2024/0071292 A1 Feb. 29, 2024

(30) Foreign Application Priority Data

Aug. 26, 2022 (KR) ........................ 10-2022-0107957

(51) Int. Cl.
*G09G 3/32* (2016.01)

(52) U.S. Cl.
CPC ........... *G09G 3/32* (2013.01); *G09G 2310/08* (2013.01); *G09G 2330/045* (2013.01)

(58) Field of Classification Search
None
See application file for complete search history.

(56) References Cited

U.S. PATENT DOCUMENTS 10,607,562 B2 3/2020 Lee et al.
2016/0140894 A1* 5/2016 Eun ...................... H04N 13/356 345/212
2016/0148570 A1* 5/2016 Lee ...................... G09G 3/3225 315/308
2021/0335166 A1 10/2021 Choi et al.
2022/0076624 A1* 3/2022 Lee ...................... G09G 3/3233
2024/0046868 A1* 2/2024 Lee ...................... G09G 3/3233

FOREIGN PATENT DOCUMENTS

KR 10-2018-0074896 A 7/2018
KR 10-2268461 B1 6/2021
KR 10-2021-0132286 A 11/2021
KR 10-2352252 B1 1/2022
KR 10-2433041 B1 8/2022

* cited by examiner

*Primary Examiner* — Ifedayo B Iluyomade
(74) *Attorney, Agent, or Firm* — Innovation Counsel LLP

(57) ABSTRACT

A display device includes: a display panel; a driving voltage generator; a power voltage generator; an input voltage generator; and a timing controller. The display panel is provided with a pixel configured to emit light by using a driving voltage. The driving voltage generator is configured to supply the driving voltage to the pixel. The power voltage generator is configured to generate power voltages for driving of the display panel by using an input voltage, and generating an input voltage sensing value by sensing the input voltage. The input voltage generator is configured to supply the input voltage to the power voltage generator. The timing controller is configured to control an operation of at least one of the driving voltage generator, the power voltage generator, and the input voltage generator according to the input voltage sensing value.

27 Claims, 14 Drawing Sheets

DISPLAY DEVICE, DRIVING METHOD THEREOF, AND ELECTRONIC DEVICE

CROSS-REFERENCE TO RELATED APPLICATION

The present application claims priority under 35 U.S.C. § 119(a) to Korean patent application No. 10-2022-0107957 filed on Aug. 26, 2022 in the Korean Intellectual Property Office, the entire disclosure of which is incorporated herein by reference.

BACKGROUND

1. Technical Field

The present disclosure generally relates to a display device, a driving method thereof, and an electronic device.

2. Related Art

Pixels provided in a display panel of a display device may emit light by using a driving voltage (ELVDD). A scan driver, a data driver, and the like, which are provided in the display device, may be driven by using power voltages supplied from a power voltage generator, e.g., a PMIC.

The driving voltage and the power voltages may be generated by converting an input voltage supplied from the power voltage generator. The input voltage may be dropped by a voltage drop or the like, and input current increases according to the drop of the input voltage. Therefore, heat may be excessively generated from the display panel.

SUMMARY

Embodiments provide a display device, a driving method of the display device, and an electronic device, which can prevent heat generation of a display panel due to a drop of an input voltage.

In accordance with an aspect of the present disclosure, there is provided a display device including: a display panel; a driving voltage generator; a power voltage generator; an input voltage generator; and a timing controller. The display panel is provided with a pixel configured to emit light by using a driving voltage. The driving voltage generator is configured to supply the driving voltage to the pixel. The power voltage generator is configured to generate power voltages for driving of the display panel by using an input voltage, and generate an input voltage sensing value by sensing the input voltage. The input voltage generator is configured to supply the input voltage to the power voltage generator. The timing controller is configured to control an operation of at least one of the driving voltage generator, the power voltage generator, and the input voltage generator according to the input voltage sensing value.

When the input voltage sensing value is equal to or lower than a first voltage, the timing controller may be configured to supply a first control signal to the input voltage generator. The input voltage generator may be configured to supply an off-signal to the timing controller, corresponding to the first control signal.

The timing controller may be configured to supply a second control signal to the driving voltage generator, corresponding to the off-signal. The driving voltage generator may be turned off corresponding to the second control signal.

The timing controller may further be configured to supply a third control signal to the power voltage generator, corresponding to the off-signal. The power voltage generator may be turned off corresponding to the third control signal.

When the input voltage sensing value is equal to or lower than a second voltage lower than a first voltage, the timing controller may be configured to supply a second control signal to the driving voltage generator and supply a third control signal to the power voltage generator. The driving voltage generator may be turned off corresponding to the second control signal, and the power voltage generator may be turned off corresponding to the third control signal.

The power voltage generator may be configured to sense the input voltage in at least one frame unit.

In accordance with another aspect of the present disclosure, there is provided a display device including: a display panel; a driving voltage generator; a power voltage generator; an input voltage generator; and a timing controller. The display panel is provided with a pixel configured to emit light by using a driving voltage. The driving voltage generator is configured to supply the driving voltage to the pixel. The power voltage generator is configured to generate power voltages for driving of the display panel by using an input voltage, generate an input voltage sensing value by sensing the input voltage, and generate a first signal or a second signal according to the input voltage sensing value. The input voltage generator is configured to supply the input voltage to the power voltage generator. The timing controller is configured to control an operation of at least one of the driving voltage generator, the power voltage generator, and the input voltage generator.

The power voltage generator may include: a first comparator and a second comparator. The first comparator is configured to generate the first signal and supply the first signal to the input voltage generator when the input voltage sensing value is equal to or lower than a first voltage. The second comparator is configured to generate the second signal and supply the second signal to the timing controller, when the input voltage sensing value is equal to or lower than a second voltage lower than the first voltage.

The input voltage generator may be configured to supply an off-signal to the timing controller, corresponding to the first signal. The timing controller may be configured to supply a 1'th control signal to the driving voltage generator, corresponding to the off-signal. The driving voltage generator may be turned off corresponding to the 1'th control signal.

The timing controller may further be configured to supply a 2'th control signal to the power voltage generator, corresponding to the off-signal. The power voltage generator may be turned off corresponding to the 2'th control signal.

The timing controller may be configured to supply a 1'th control signal to the driving voltage generator and supply a 2'th control signal to the power voltage generator, corresponding to the second signal. The driving voltage controller may be turned off corresponding to the 1'th control signal, and the power voltage generator may be turned off corresponding to the 2'th control signal.

The power voltage generator may further include a third comparator configured to turn off the power voltage generator when the input voltage sensing value is equal to or higher than a third voltage.

In accordance with still another aspect of the present disclosure, there is provided a method of driving a display device. The method includes: supplying, by an input voltage generator, an input voltage to a power voltage generator; generating an input voltage sensing value by sensing the input voltage supplied to the power voltage generator; and controlling an operation of at least one of the input voltage generator, the power voltage generator, and a driving voltage generator according to the input voltage sensing value.

The controlling may include: when the input voltage sensing value is equal to or lower than a first voltage, supplying, by a timing controller, a first control signal to the input voltage generator; supplying, by the input voltage generator, an off-signal to the timing controller, corresponding to the first control signal; supplying, by the timing controller, a second control signal to the driving voltage generator, corresponding to the off-signal; and turning off the driving voltage generator, corresponding to the second control signal.

The controlling may further include: supplying, by the timing controller, a third control signal to the power voltage generator, corresponding to the off-signal; and turning off the power voltage generator, corresponding to the third control signal.

The controlling may include: when the input voltage sensing value is equal to or lower than a second voltage lower than a first voltage, supplying, by a timing controller, a second control signal and a third control signal respectively to the driving voltage generator and the power voltage generator; and turning off the driving voltage generator and the power voltage generator, respectively corresponding to the second control signal and the third control signal.

The controlling may include: when the input voltage sensing value is equal to or lower than a first voltage, supplying, by the power voltage generator, a first signal to the input voltage generator; supplying, by the input voltage generator, an off-signal to a timing controller, corresponding to the first signal; supplying, by the timing controller, a 1'th control signal to the driving voltage generator, corresponding to the off-signal; and turning off the driving voltage generator, corresponding to the 1'th control signal.

The controlling may further include: supplying, by the timing controller, a 2'th control signal to the power voltage generator, corresponding to the off-signal; and turning off the power voltage generator, corresponding to the 2'th control signal.

The controlling may include: when the input voltage sensing value is equal to or lower than a second voltage lower than a first voltage, supplying, by the power voltage generator, a second signal to a timing controller; supplying, by the timing controller, a 1'th control signal and a 2'th control signal respectively to the driving voltage generator and the power voltage generator, corresponding to the second signal; and turning off the driving voltage generator and the power voltage generator, respectively corresponding to the 1'th control signal and the 2'th control signal.

The controlling may include turning off the power voltage generator when the input voltage sensing value is equal to or higher than a third voltage.

In accordance with still another aspect of the present disclosure, there is provided an electronic device including: a driving voltage generator; a power voltage generator; a timing controller; and an input voltage generator. The driving voltage generator is configured to supply a driving voltage to a pixel. The power voltage generator is configured to generate power voltages for driving of a display panel by using an input voltage, and generate an input voltage sensing value by sensing the input voltage. The timing controller is configured to control an operation of at least one of the driving voltage generator, the power voltage generator, and the input voltage generator. The input voltage generator is configured to supply the input voltage to the power voltage generator according to the input voltage sensing value.

When the input voltage sensing value is equal to or lower than a first voltage, the timing controller may be configured to supply a first control signal to the input voltage generator. The input voltage generator may be configured to supply an off-signal to the timing controller, corresponding to the first control signal.

The timing controller may be configured to supply a second control signal to the driving voltage generator, corresponding to the off-signal. The driving voltage generator may be turned off corresponding to the second control signal.

The timing controller may further be configured to supply a third control signal to the power voltage generator, corresponding to the off-signal. The power voltage generator may be turned off corresponding to the third control signal.

When the input voltage sensing value is equal to or lower than a second voltage lower than a first voltage, the timing controller may be configured to supply a second control signal to the driving voltage generator and supply a third control signal to the power voltage generator. The driving voltage generator may be turned off corresponding to the second control signal, and the power voltage generator may be turned off corresponding to the third control signal.

The power voltage generator may be configured to sense the input voltage in at least one frame unit.

In accordance with still another aspect of the present disclosure, there is provided an electronic device including: a driving voltage generator; a power voltage generator; a timing controller; and an input voltage generator. The driving voltage generator is configured to supply a driving voltage to a pixel. The power voltage generator is configured to generate power voltages necessary for driving of a display panel by using an input voltage, generate an input voltage sensing value by sensing the input voltage, and generate a first signal or a second signal according to the input voltage sensing value. The timing controller is configured to control an operation of at least one of the driving voltage generator, the power voltage generator, and the input voltage generator. The input voltage generator is configured to supply the input voltage to the power voltage generator.

The power voltage generator may include: a first comparator and a second comparator. The first comparator is configured to generate the first signal and supply the first signal to the input voltage generator when the input voltage sensing value is equal to or lower than a first voltage. The second comparator is configured to generate the second signal and supply the second signal to the timing controller, when the input voltage sensing value is equal to or lower than a second voltage lower than the first voltage.

The input voltage generator may be configured to supply an off-signal to the timing controller, corresponding to the first signal. The timing controller may be configured to supply a 1'th control signal to the driving voltage generator, corresponding to the off-signal. The driving voltage generator may be turned off corresponding to the 1'th control signal.

The timing controller may further be configured to supply a 2'th control signal to the power voltage generator, corresponding to the off-signal. The power voltage generator may be turned off corresponding to the 2'th control signal.

The timing controller may be configured to supply a 1'th control signal to the driving voltage generator and supply a 2'th control signal to the power voltage generator, corresponding to the second signal. The driving voltage controller may be turned off corresponding to the 1'th control signal, and the power voltage generator may be turned off corresponding to the 2'th control signal.

The power voltage generator may further include a third comparator configured to turn off the power voltage generator when the input voltage sensing value is equal to or higher than a third voltage.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
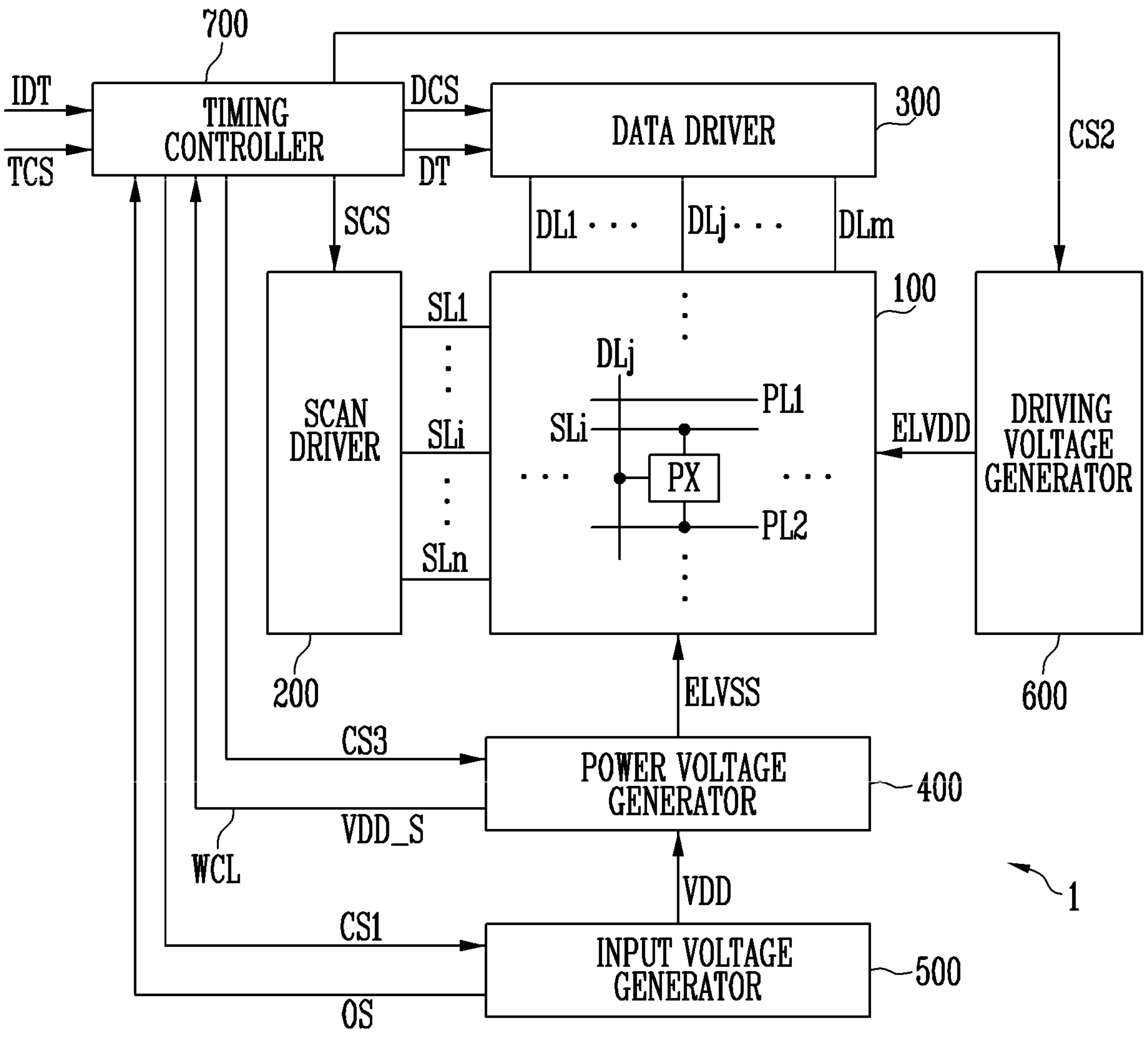
FIGS. 1 and 2 are diagrams illustrating a display device in accordance with an embodiment of the present disclosure.

The present disclosure may apply various changes and different shapes, therefore only illustrates details with particular examples. As used herein, the singular forms are intended to include the plural forms as well, unless the context clearly indicates otherwise.

Meanwhile, the present disclosure is not limited to embodiments disclosed below, and may be implemented in various forms. Each embodiment disclosed below may be independently embodied or be combined with at least another embodiment prior to being embodied.

As used in this specification, the term "A and/or B" or "at least one of A, B, and C" may include all possible combinations of items listed together.

In the following embodiments and the attached drawings, elements not directly related to the present disclosure are omitted from depiction, and dimensional relationships among individual elements in the attached drawings are illustrated only for ease of understanding but not to limit the actual scale. It should note that in giving reference numerals to elements of each drawing, like reference numerals refer to like elements even though like elements are shown in different drawings.

Figure 2:
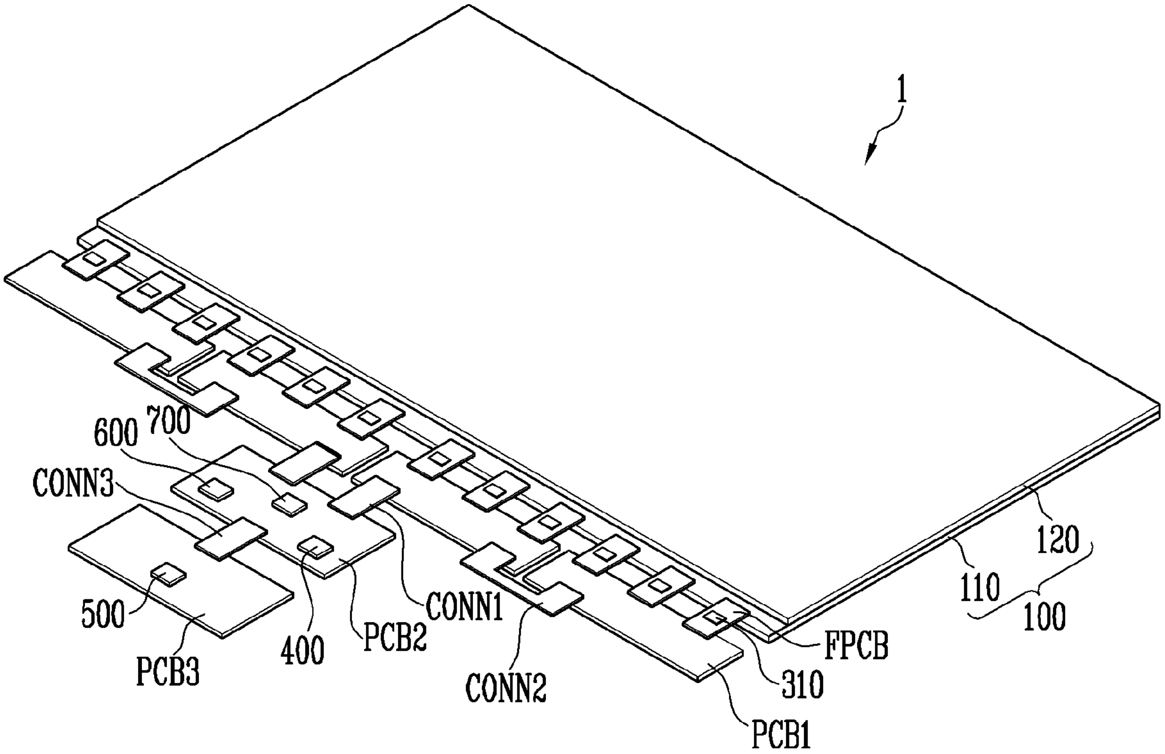

FIGS. 1 and 2 are diagrams illustrating a display device 1 in accordance with an embodiment of the present disclosure. A block diagram of the display device 1 is illustrated in FIG. 1, and a perspective view is illustrated in FIG. 2.

Referring to FIGS. 1 and 2, the display device 1 may include a display panel 100, a scan driver 200, a data driver 300, a power voltage generator 400, an input voltage generator 500, a driving voltage generator 600, and a timing controller 700.

The display panel 100 may display an image. The display panel 100 may be an organic light emitting display panel, a liquid crystal display panel, an electrophoretic display panel, or an inorganic light emitting display panel.

As shown in FIG. 2, the display panel 100 may include a lower substrate 110 and an upper substrate 120. The lower substrate 110 may be a thin film transistor substrate made of plastic or glass. The upper substrate 120 may be an encapsulation substrate made of a plastic film, a glass substrate, or a protective film.

The display panel 100 may include scan lines SL1 to SLn, data lines DL1 to DLm, a first power line PL1, a second power line PL2, and pixels PX, where each of n and m is a positive integer.

The pixels PX may be disposed or located in areas, e.g., pixel areas, partitioned by the scan lines SL1 to SLn and the data lines DL1 to DLm.

A pixel PX may be connected to one of the scan lines SL1 to SLn and one of the data lines DL1 to DLm. For example, a pixel PX located on an ith row and a jth column may be connected to an ith scan line SLi and a jth data line DLj, where each of i and j is a positive integer.

Also, the pixel PX may be electrically connected between the first power line PL1 and the second power line PL2. A driving voltage ELVDD, e.g., a first power voltage, may be supplied to the first power line PL1, and a ground voltage ELVSS, e.g., a second power voltage, may be supplied to the second power line PL2.

The pixel PX may store or record a data signal, e.g., a data voltage, supplied through the jth data line DLj in response to a scan signal supplied through the ith scan line SLi, and emit light with a luminance corresponding to the stored data signal. A detailed configuration of the pixel PX will be described later with reference to FIG. 3.

The scan driver 200 may generate a scan signal (or scan signals), based on a scan control signal SCS, and sequentially supply the scan signal to the scan lines SL1 to SLn. The scan control signal SCS may include a start signal, clock signals, and the like, and be supplied to the scan driver 200 from the timing controller 700. For example, the scan driver 200 may be implemented with a shift register which sequentially generates and outputs a scan signal in a pulse form by sequentially shifting the start signal in a pulse form by using the clock signals.

The scan driver 200 may be formed together with the pixel PX on the display panel 100. However, in an embodiment, the scan driver 200 may be mounted on a circuit film, and be connected to the timing controller 700 via at least one circuit film and a printed circuit board.

A case where the scan driver 200 is located at one side of the display panel 100 is illustrated in FIG. 1. However, the scan driver 200 is located in other locations in an embodiment. For example, the scan driver 200 may be located at both sides, e.g., left and right sides, of the display panel 100, or be distributed and disposed in the display panel 100.

The data driver 300 may generate data signals, e.g., data voltages, based on image data DT and a data control signal DCS, which are supplied from the timing controller 700. The data driver 300 may supply the data signals to the display panel 100, e.g., the pixels PX, through the data lines DL1 to DLm. The data control signal DCS is a signal for controlling an operation of the data driver 300, and may include a load signal, e.g., a data enable signal, instructing an output of a valid data signal, a horizontal start signal, a data clock signal, and the like. For example, the data driver 300 may include a shift register which generates a sampling signal by shifting the horizontal start signal in synchronization with the data clock signal, a latch which latches the image data DT in response to the sampling signal, a digital-analog converter, e.g., a decoder, which converts the latched image data, e.g., data in a digital form, into data signals in an analog form, and buffers, e.g., amplifiers, which output the data signals to the data lines DL1 to DLm.

As shown in FIG. 2, the data driver 300 may include a plurality of data driver integrated circuits (ICs) 310. The data driver IC 310 may be mounted on a flexible circuit board FPCB, and be electrically connected to the timing controller 700 via at least one printed circuit board PCB1 and PCB2 and/or at least one connection member CONN1 and CONN2.

The power voltage generator 400 may generate the ground voltage ELVSS by using an input voltage VDD supplied from the input voltage generator 500, and supply the ground voltage ELVSS to the display panel 100, e.g., the pixels PX. For example, the power voltage generator 400 may be implemented as a power management integrated circuit (PMIC), and convert the input voltage VDD into the ground voltage ELVSS through a switching operation on transistors provided therein.

Also, the power voltage generator 400 may generate and supply a power voltage necessary for driving of the display panel 100, the scan driver 200, the data driver 300, the driving voltage generator 600, the timing controller 700, and the like by using the input voltage VDD, and control the supplied power voltage.

In an embodiment, the power voltage generator 400 may sense the input voltage VDD supplied from the input voltage generator 500. The power voltage generator 400 may include a pin for sensing the input voltage VDD, and generate an input voltage sensing value VDD_S by sensing the input voltage VDD supplied from the input voltage generator 500. For example, the power voltage generator 400 may include an analog-digital converter for converting the input voltage VDD in an analog form into the input voltage sensing value VDD_S in a digital form. The input voltage sensing value VDD_S may be provided to the timing controller 700 through a wired communication line WCL, and be used to control driving of at least one of the power voltage generator 400 and the driving voltage generator 600.

In an embodiment, the power voltage generator 400 may set a frame unit for sensing the input voltage VDD, and sense the input voltage VDD in at least one frame unit. For example, the power voltage generator 400 may sense the input voltage VDD in 1 frame unit, 2 frame units, 4 frame units, 8 frame units, 32 frame units, or 128 frame units.

In an embodiment, the power voltage generator 400 may be turned off corresponding to a third control signal CS3 supplied from the timing controller 700. A detailed operation of the power voltage generator 400, which is associated with this, will be described later with reference to FIGS. 6 and 7.

The input voltage generator 500 may generate the input voltage VDD and supply the input voltage VDD to the power voltage generator 400. For example, the input voltage generator 500 may be implemented as a SET IC, and generate the input voltage VDD through a main power management circuit (MPMC) included therein and then supply the input voltage VDD to the power voltage generator 400. The input voltage VDD may be a voltage which becomes the basis of a power voltage necessary for driving of all circuit components of the display device 1. For example, the input voltage VDD may be boosted or dropped in the power voltage generator 400 to be converted into a power voltage necessary for driving of the display panel 100, the scan driver 200, the data driver 300, the power voltage generator 400, the driving voltage generator 600, the timing controller 700, and the like.

In an embodiment, the input voltage generator 500 may generate an off-signal OS, corresponding to a first control signal CS1 supplied from the timing controller 700, and supply the off-signal OS to the timing controller 700. A detailed operation of the input voltage generator 500, which is associated with this, will be described later with reference to FIGS. 4 to 7.

As shown in FIG. 2, the input voltage generator 500 may be mounted a printed circuit board PCB3, and be electrically connected to the power voltage generator 400 via at least one cable CONN3.

The driving voltage generator 600 may generate the driving voltage ELVDD by using a power voltage (not shown) supplied from the power voltage generator 400, and supply the driving voltage ELVDD to the display panel 100, e.g., the pixels PX. For example, the driving voltage generator 600 may convert the power voltage (not shown) supplied from the power voltage generator 400 into the driving voltage ELVDD through a switching operation on transistors provided therein. The driving voltage ELVDD is a power voltage necessary for an operation of the pixel PX, and may have a voltage level higher than a voltage level of the ground voltage ELVSS.

In an embodiment, the driving voltage generator 600 may be turned off corresponding to a second control signal CS2 supplied from the timing controller 700. A detailed operation of the driving voltage generator 600, which is associated with this, will be described later with reference to FIGS. 4 to 9.

The timing controller 700 may receive input image data IDT and a timing control signal TCS from an external device, e.g., a graphic processor, generate the scan control signal SCS and the data control signal DCS, based on the timing control signal TCS, and generate the image data DT by converting the input image data IDT. The timing control signal TCS may include a vertical synchronization signal, a horizontal synchronization signal, a reference clock signal, and the like. The vertical synchronization signal may represent a start of frame data, i.e., data corresponding to a frame period in which one frame image is displayed, and the horizontal synchronization signal may represent a start of a data row, i.e., one data row among a plurality of data rows included in the frame data. For example, the timing controller 700 may convert the input image data IDT in an RGB format into the image data DT in an RGBG format, which accords with a structuring of the pixels PX in the display panel 100.

The timing controller 700 may perform wired communication, e.g., I2C communication, with the power voltage generator 400 through the wired communication line WCL, and be provided with the input voltage sensing value VDD_S generated by the power voltage generator 400.

In an embodiment, the timing controller 700 may control an operation of at least one of the power voltage generator 400, the input voltage generator 500, and the driving voltage generator 600 according to the input voltage sensing value VDD_S. For example, according to the input voltage sensing value VDD_S, the timing controller 700 may generate at least one of the first control signal CS1 supplied to the input voltage generator 500, the second control signal CS2 for turning off the driving voltage generator 600, corresponding to the off-signal OS supplied from the input voltage generator 500, and the third control signal CS3 for turning off the power voltage generator 400. A detailed operation of the timing controller 700, which is associated with this, will be described later with reference to FIGS. 4 to 9.

Figure 3:
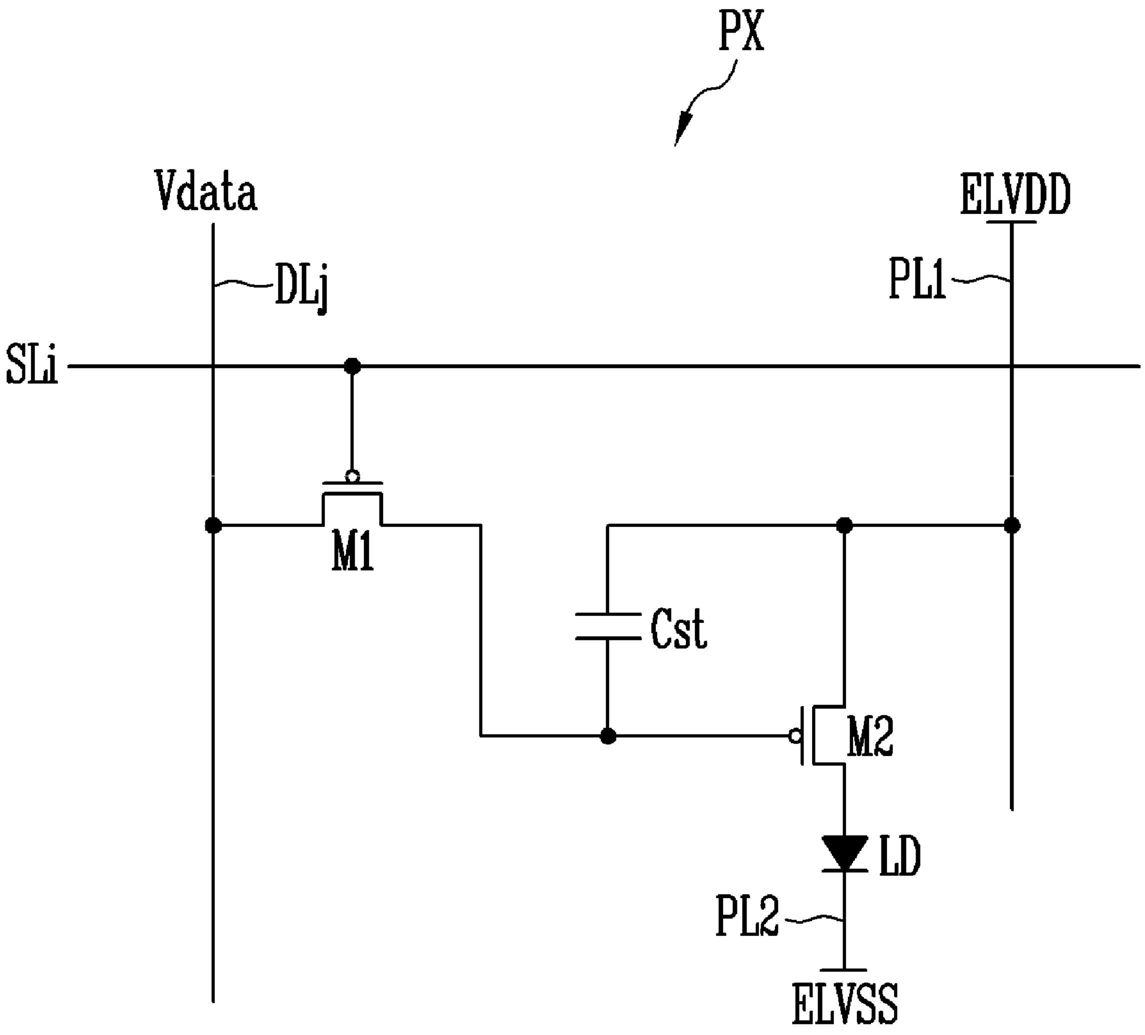
FIG. 3 is a diagram illustrating an example of a pixel included in the display device shown in FIG. 1.

FIG. 3 is a diagram illustrating an example of the pixel PX included in the display device 1 shown in FIG. 1. For convenience of descriptions, a pixel PX located on an ith row and a jth column is exemplarily illustrated.

Referring to FIG. 3, the pixel PX may be connected to an ith scan line SLi, a jth data line DLj, a first power line PL1, and a second power line PL2.

The pixel PX may include a light emitting element LD, a first transistor M1, e.g., a switching transistor, a second transistor M2, e.g., a driving transistor, and a storage capacitor Cst. Each of the first transistor M1 and the second transistor M2 may be a thin film transistor including an oxide semiconductor, but includes other material in an embodiment. For example, at least a portion of the first transistor M1 and the second transistor M2 may include a poly-silicon semiconductor, or be implemented with an N-type semiconductor or a P-type semiconductor.

A first electrode, e.g., an anode electrode, of the light emitting element LD may be connected to a second electrode, e.g., a drain electrode, of the second transistor M2. The first electrode of the light emitting element LD may be connected to the first power line PL1 via the second transistor M2. A driving voltage ELVDD may be supplied to the first power line PL1. A second electrode, e.g., a cathode electrode, of the light emitting element LD may be connected to the second power line PL2. A ground voltage ELVSS may be supplied to the second power line PL2. The light emitting element LD may generate light with a predetermined luminance corresponding to an amount of current, e.g., a driving current, supplied from the second transistor M2. For example, the light emitting element LD may be configured as an organic light emitting diode. However, in an embodiment, the light emitting element LD may be configured as an inorganic light emitting diode such as a micro LED (light emitting diode) or a quantum dot light emitting diode, or be a light emitting diode configured with a combination of an organic material and an inorganic material.

A first electrode of the first transistor M1 may be connected to the jth data line DLj, and a second electrode of the first transistor M1 may be connected to a gate electrode of the second transistor M2. A gate electrode of the first transistor M1 may be connected to the ith scan line SLi. When a scan signal is supplied to the ith scan line SLi, the first transistor M1 may be turned on, to transfer a data signal Vdata, e.g., a data voltage, from the jth data line DLj to the gate electrode of the second transistor M2.

The storage capacitor Cst may be formed or connected between the first electrode, e.g., a source electrode, and the gate electrode of the second transistor M2. The storage capacitor Cst may charge a voltage corresponding to the data signal Vdata.

A first electrode of the second transistor M2 may be connected to the first power line PL1, and a second electrode of the second transistor M2 may be connected to the anode electrode of the light emitting element LD. The gate electrode of the second transistor M2 may be connected to the second electrode of the first transistor M1. The second transistor M2 may control a current amount flowing through the light emitting element LD, corresponding to a gate-source voltage Vgs applied between the gate electrode and the first electrode of the second transistor M2.

However, in an embodiment, the pixel PX has a circuit structure other than the circuit structure shown in FIG. 3.

Figure 4:
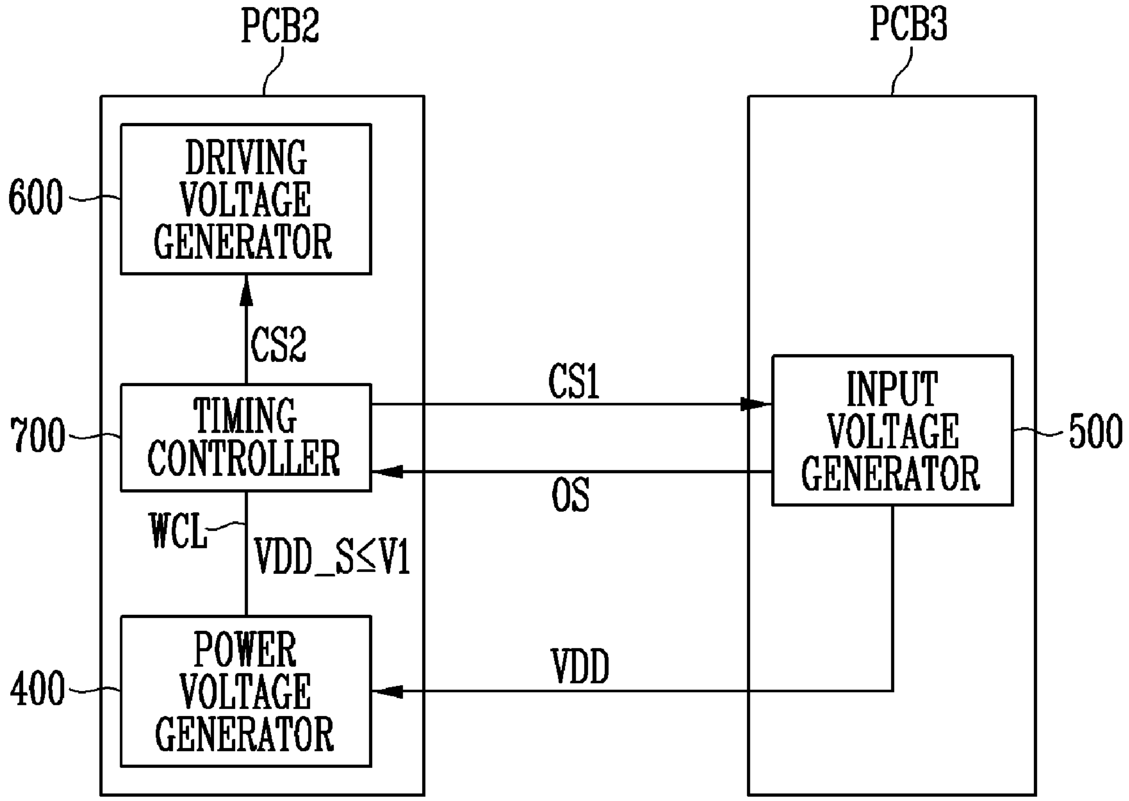
FIG. 4 is a diagram illustrating an operation of components included in the display device shown in FIG. 1 in accordance with an embodiment of the present disclosure.
Figure 5:
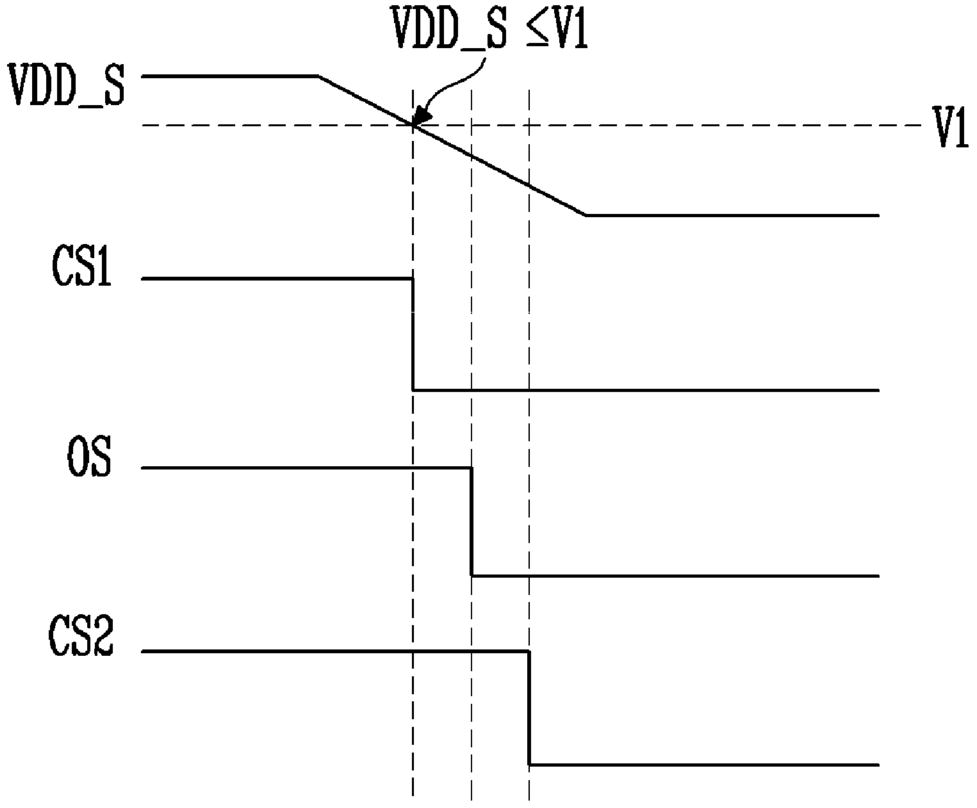
FIG. 5 is a diagram illustrating waveforms of signals shown in FIG. 4.

FIG. 4 is a diagram illustrating an operation of components included in the display device 1 shown in FIG. 1 in accordance with an embodiment of the present disclosure. FIG. 5 is a diagram illustrating waveforms of signals shown in FIG. 4. The components included in the display device 1 mean the power voltage generator 400, the input voltage generator 500, the driving voltage generator 600, and the timing controller 700, and the signals shown in FIG. 4 mean the first control signal CS1, the off-signal OS, and the second control signal CS2.

Referring to FIGS. 4 and 5, an input voltage VDD may be supplied from the input voltage generator 500 to the power voltage generator 400. The power voltage generator 400 may generate an input voltage sensing value VDD_S by sensing the input voltage VDD. The timing controller 700 may be provided with the input voltage sensing value VDD_S generated by the power voltage generator 400 through the wired communication line WCL.

In an embodiment, when the input voltage sensing value VDD_S is equal to or lower than a first voltage V1, the timing controller 700 may supply the first control signal CS1 having a low level to the input voltage generator 500. The input voltage generator 500 may supply the off-signal OS having the low level to the timing controller 700, corresponding to the first control signal CS1 having the low level.

The timing controller 700 may supply the second control signal CS2 having the low level to the driving voltage generator 600, corresponding to the off-signal OS having the low level. The driving voltage generator 600 may be turned off corresponding to the second control signal CS2 having the low level, and accordingly, the driving voltage ELVDD may not be supplied to the display panel 100. Thus, the display panel 100 is turned off, so that heat generation due to a drop of the input voltage VDD can be effectively prevented.

That is, when the input voltage VDD becomes equal to or lower than the first voltage V1, an input current increases, and therefore, heat may be generated in the display panel 100. In the embodiment of the present disclosure, when the input voltage VDD becomes equal to or lower than the first voltage V1, the display panel 100 is turned off, so that the heat generation of the display panel 100 can be prevented.

Figure 6:
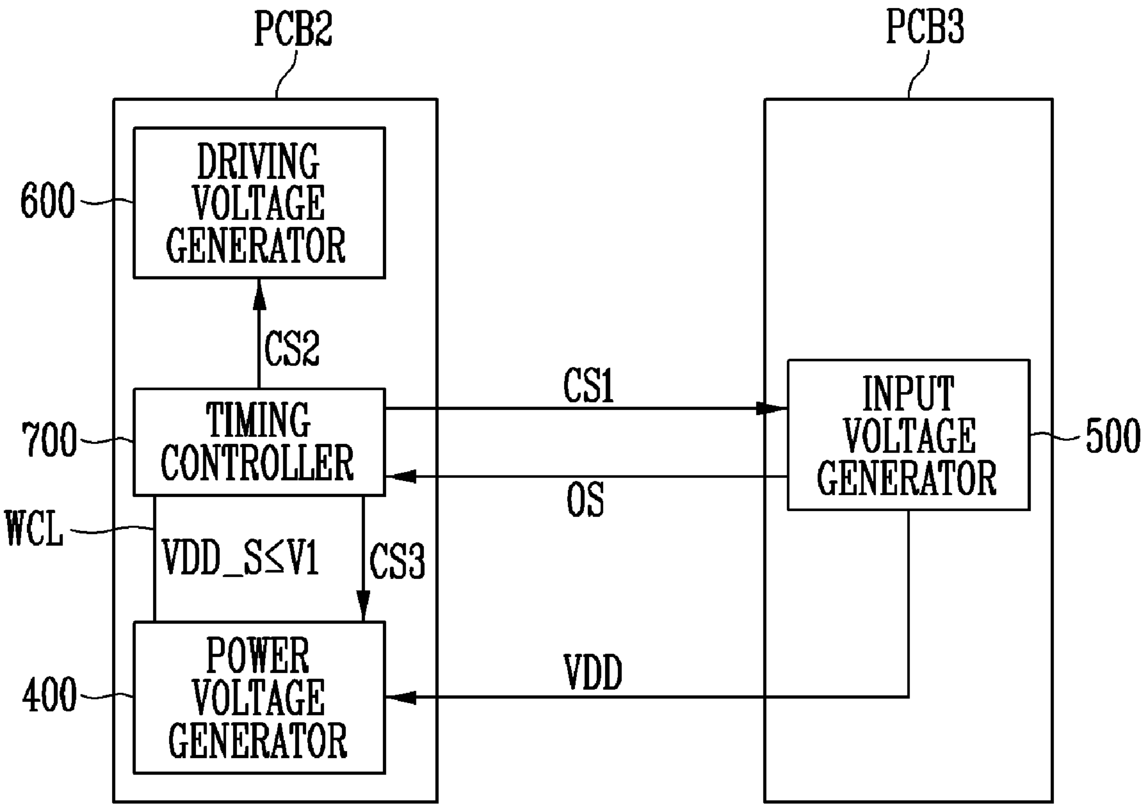
FIG. 6 is a diagram illustrating an operation of the components included in the display device shown in FIG. 1 in accordance with an embodiment of the present disclosure.
Figure 7:
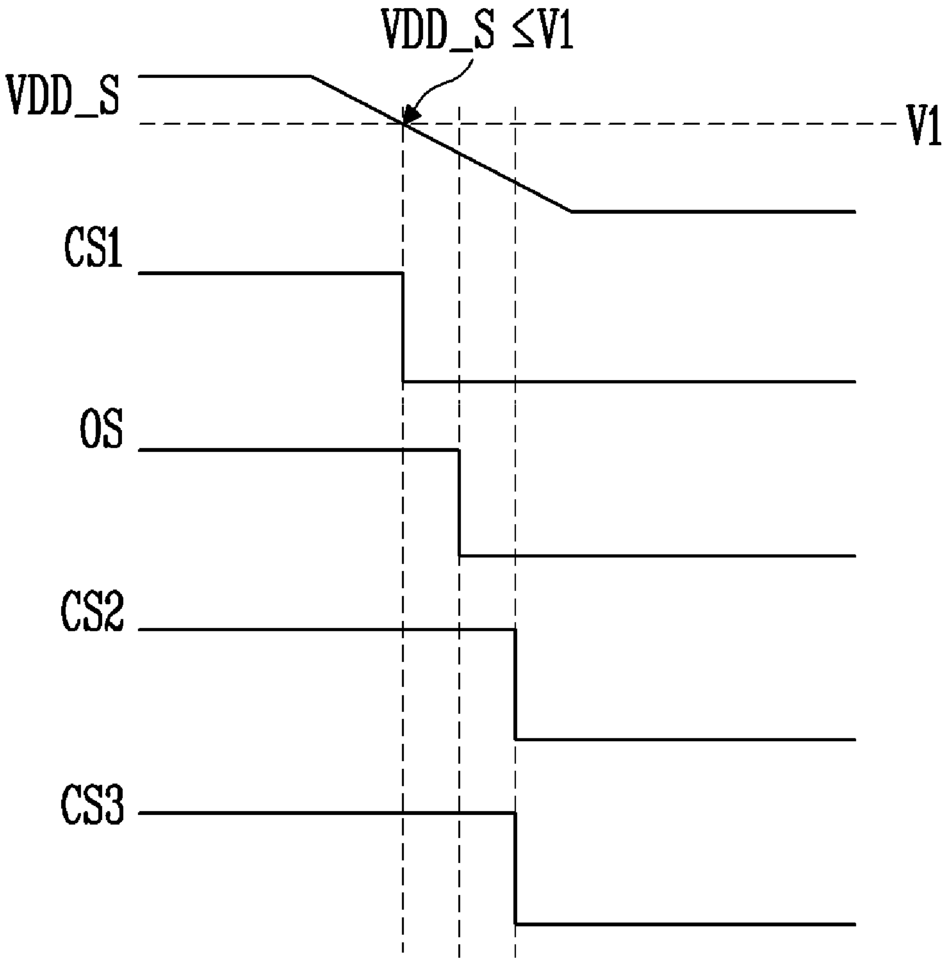
FIG. 7 is a diagram illustrating waveforms of signals shown in FIG. 6.

FIG. 6 is a diagram illustrating an operation of the components included in the display device 1 shown in FIG. 1 in accordance with an embodiment of the present disclosure. FIG. 7 is a diagram illustrating waveforms of signals shown in FIG. 6. In relation to FIGS. 6 and 7, descriptions of portions overlapping with the portions shown in FIGS. 4 and 5 will be omitted.

Referring to FIGS. 6 and 7, when the input voltage sensing value VDD_S is equal to or lower than the first voltage V1, the timing controller 700 may further supply the third control signal CS3 having the low level to the power voltage generator 400, corresponding to the off-signal OS having the low level. The power voltage generator 400 may be turned off corresponding to the third control signal CS3 having the low level, and accordingly, the power voltage may not be supplied to the scan driver 200, the data driver 300, the driving voltage generator 600, the timing controller 700, and the like, including the display panel 100. Thus, the scan driver 200, the data driver 300, the driving voltage generator 600, the timing controller 700, and the like, including the display panel 100 are turned off, so that the heat generation due to the drop of the input voltage VDD can be more effectively prevented.

Figure 8:
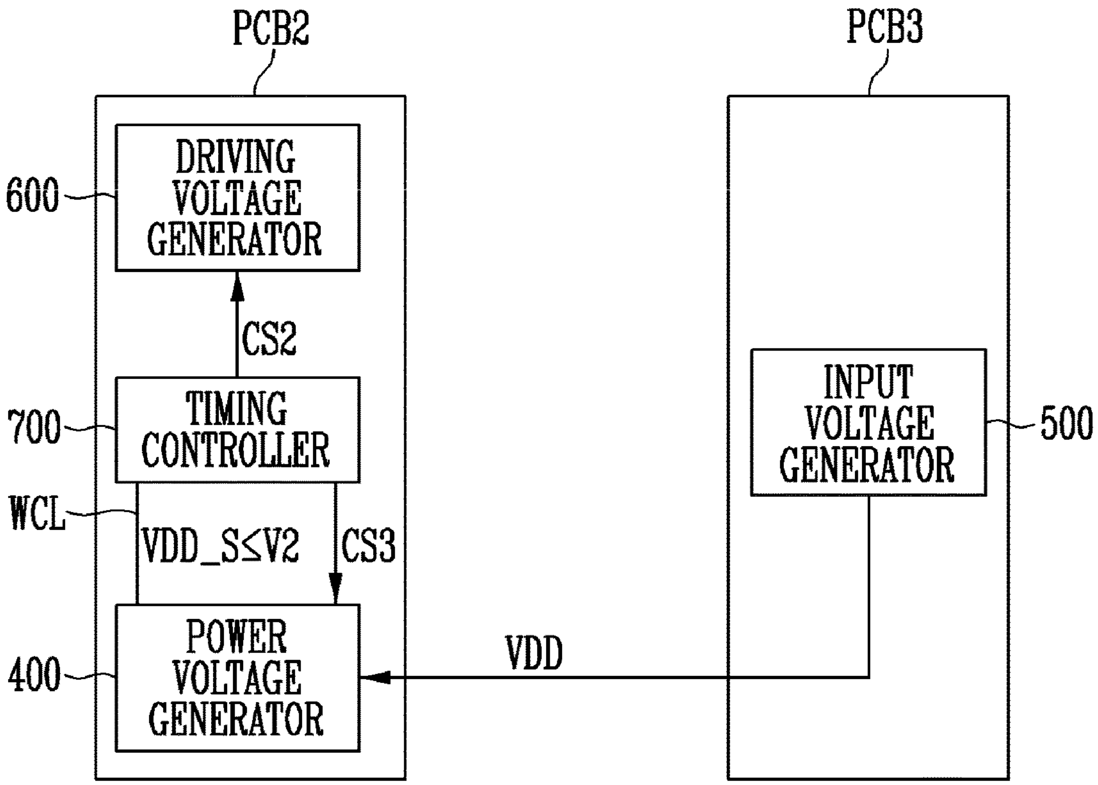
FIG. 8 is a diagram illustrating an operation of the components included in the display device shown in FIG. 1 in accordance with an embodiment of the present disclosure.
Figure 9:
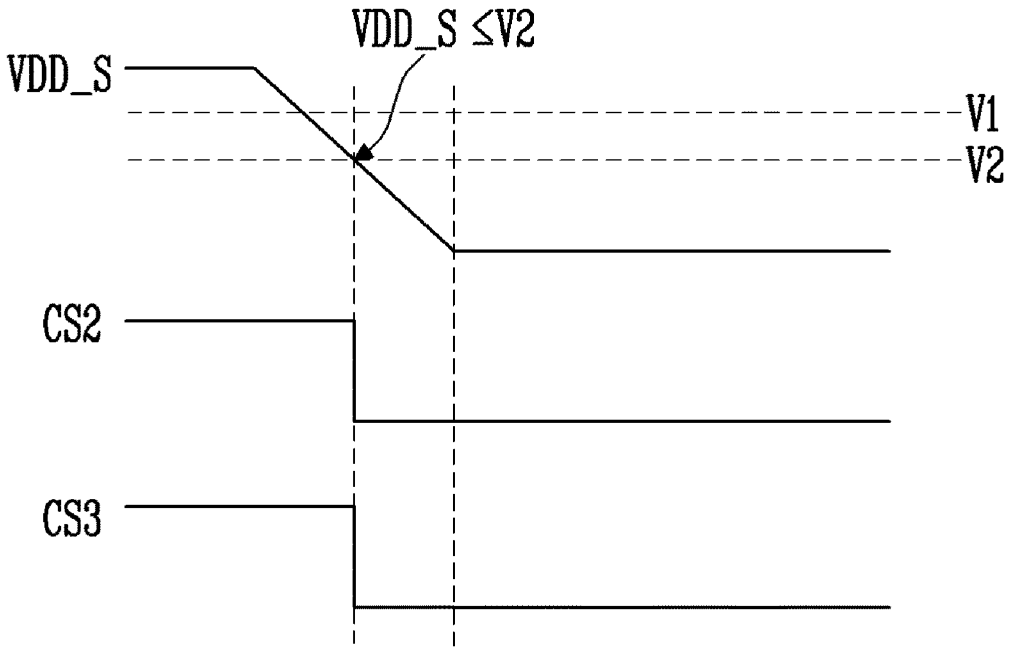
FIG. 9 is a diagram illustrating waveforms of signals shown in FIG. 8.

FIG. 8 is a diagram illustrating an operation of the components included in the display device 1 shown in FIG. 1 in accordance with an embodiment of the present disclosure. FIG. 9 is a diagram illustrating waveforms of signals shown in FIG. 8. In relation to FIGS. 8 and 9, descriptions of portions overlapping with the portions shown in FIGS. 4 and 5 will be omitted.

Referring to FIGS. 8 and 9, when the input voltage sensing value VDD_S is equal to or lower than a second voltage V2, the timing controller 700 may supply the second control signal CS2 having the low level to the driving voltage generator 600, and supply the third control signal CS3 having the low level to the power voltage generator 400. That is, when the input voltage sensing value VDD_S is equal to or lower than the second voltage V2, the timing controller 700 rapidly controls the driving voltage generator 600 and the power voltage generator 400 by generating the second control signal CS2 and the third control signal CS3 regardless of the input voltage generator 500, e.g., regardless of the first control signal CS1 and the off-signal OS, so that an excessive drop of the input voltage VDD can be effective prevented.

The driving voltage generator 600 may be turned off corresponding to the second control signal CS2 having the low level, and accordingly, the driving voltage ELVDD may not be supplied to the display panel 100. In addition, the power voltage generator 400 may be turned off corresponding to the third control signal CS3 having the low level, and accordingly, the power voltage may not be supplied to the scan driver 200, the data driver 300, the driving voltage generator 600, the timing controller 700, and the like, including the display panel 100. Thus, the scan driver 200, the data driver 300, the driving voltage generator 600, the timing controller 700, and the like, including the display panel 100 are turned off, so that heat generation due to the excessive drop of the input voltage VDD can be effectively prevented.

In an embodiment, the first voltage V1 may be set to a voltage level higher than a voltage level of the second voltage V2 or the second voltage V2 may be set to a voltage level lower than a voltage level of the first voltage V1. For example, the first voltage V1 may be set to 27V, and the second voltage V2 may be set to 24V.

Figure 10:
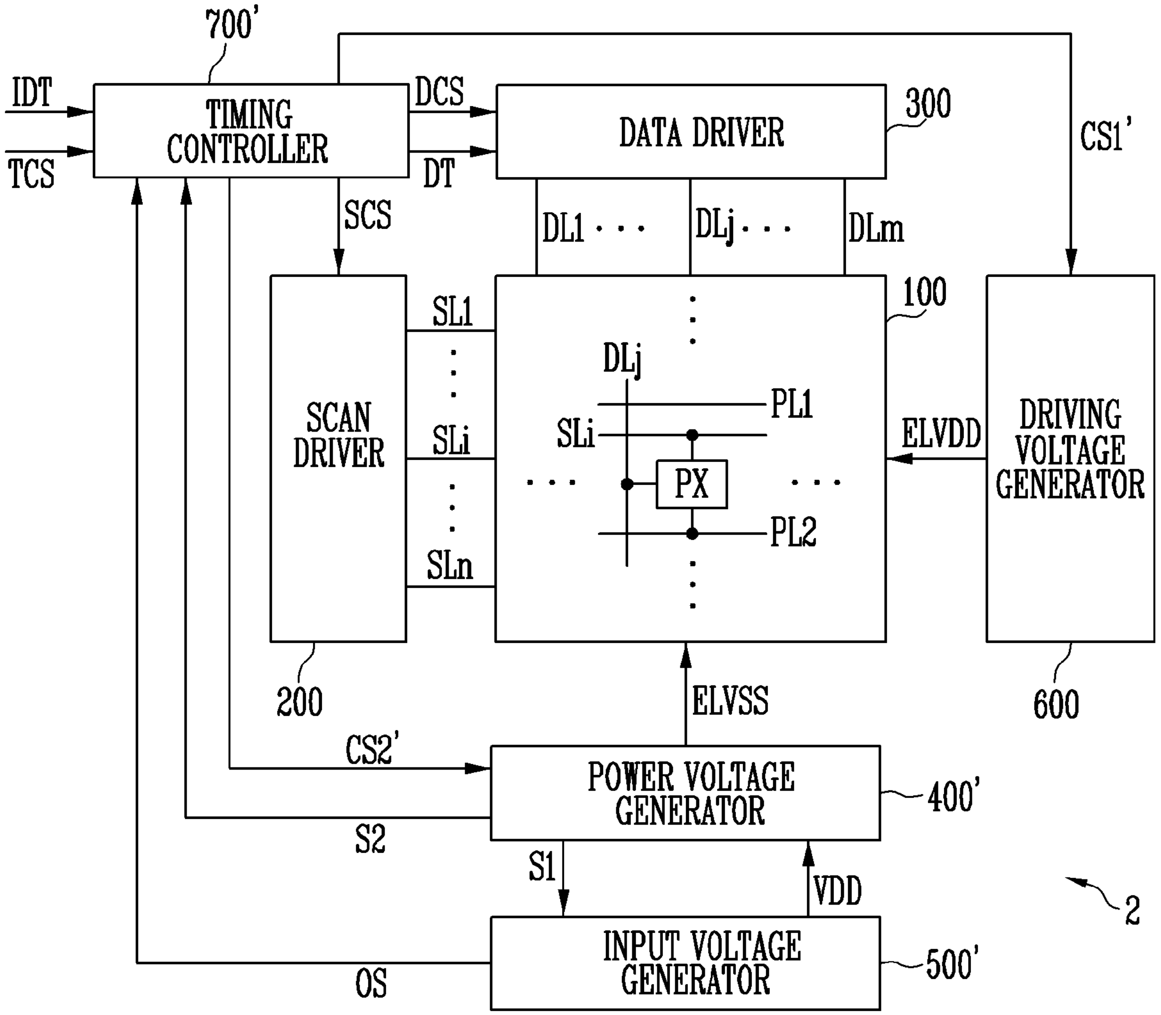
FIG. 10 is a diagram illustrating a display device in accordance with an embodiment of the present disclosure.

FIG. 10 is a diagram illustrating a display device 2 in accordance with an embodiment of the present disclosure. In relation to FIG. 10, descriptions of portions overlapping with the portions shown in FIG. 1 will be omitted.

Referring to FIG. 10, the display device 2 may include a display panel 100, a scan driver 200, a data driver 300, a power voltage generator 400, an input voltage generator 500, a driving voltage generator 600, and a timing controller 700'.

The power voltage generator 400' may sense an input voltage VDD supplied from the input voltage generator 500'. The power voltage generator 400' may include a pin for sensing the input voltage VDD, and generate an input voltage sensing value VDD_S' by sensing the input voltage VDD supplied from the input voltage generator 500'. The input voltage sensing value VDD_S' may be the same voltage as the input voltage VDD.

The power voltage generator 400' may generate a first signal S1 for controlling an operation of the input voltage generator 500' or a second signal S2 for controlling an operation of the timing controller 700' according to the input voltage sensing value VDD_S'. That is, unlike the power voltage generator 400 shown in FIG. 1, which performs only sensing of the input voltage VDD, the power voltage generator 400' shown in FIG. 10 may generate a signal S1 or S2 for actively controlling an operation of at least one of the input voltage generator 500' and the timing controller 700' according to the input voltage sensing value VDD_S'.

Also, the power voltage generator 400' may be turned off corresponding to a 2'th control signal CS2' supplied from the timing controller 700'. A detailed operation of the power voltage generator 400', which is associated with this, will be described later with reference to FIGS. 11 and 12A to 12C.

The input voltage generator 500' may generate the input voltage VDD and supply the input voltage VDD to the power voltage generator 400'. The input voltage generator 500' may generate an off-signal OS for controlling an operation of the timing controller 700, corresponding to the first signal S1 supplied from the power voltage generator 400'. That is, unlike the input voltage generator 500 shown in FIG. 1, of which operation is controlled by the timing controller 700, an operation of the input voltage generator 500' shown in FIG. 10 may be controlled by the power voltage generator 400'.

The timing controller 700' may control an operation of at least one of the power voltage generator 400 and the driving voltage generator 600 according to a signal supplied from the power voltage generator 400' or the input voltage generator 500'. For example, the timing controller 700' may generate at least one of a 1'th control signal CS1' for turning off the driving voltage generator 600 and the 2'th control signal CS2' for turning off the power voltage generator 400, corresponding to the second signal S2 supplied from the power voltage generator 400' or the off-signal OS supplied to the input voltage generator 500'. A detailed operation of the timing controller 700', which is associated with this, will be described later with reference to FIGS. 11 and 12A to 12C.

Figure 11:
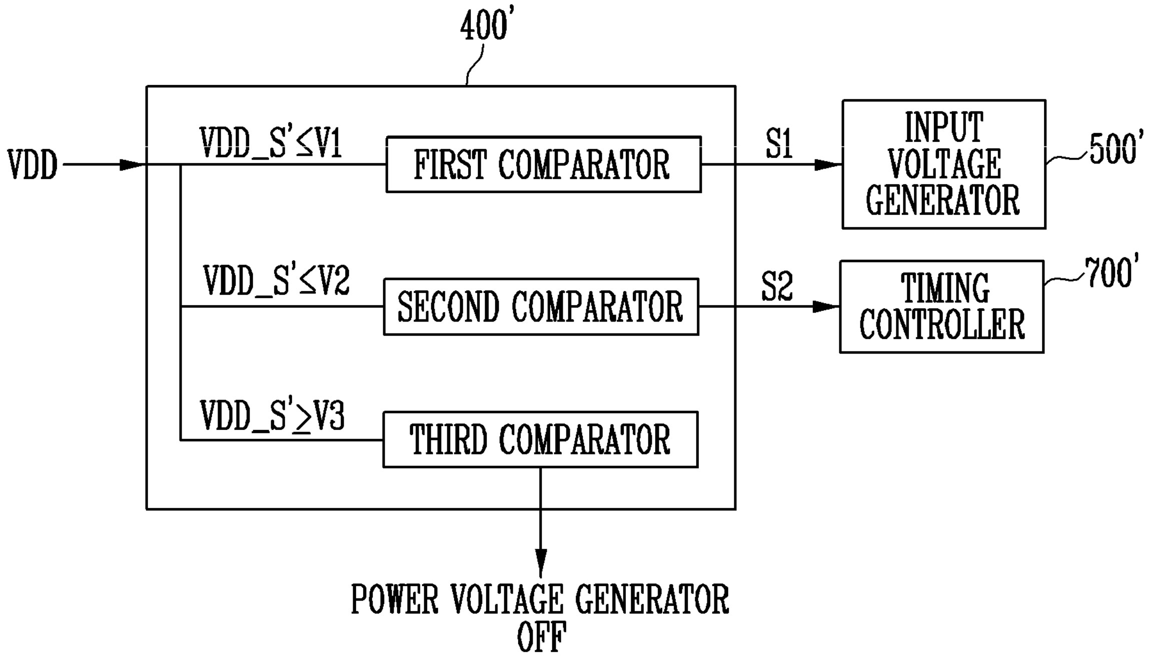
FIG. 11 is a diagram illustrating an example of a power voltage generator included in the display device shown in FIG. 10.
Figure 12A:
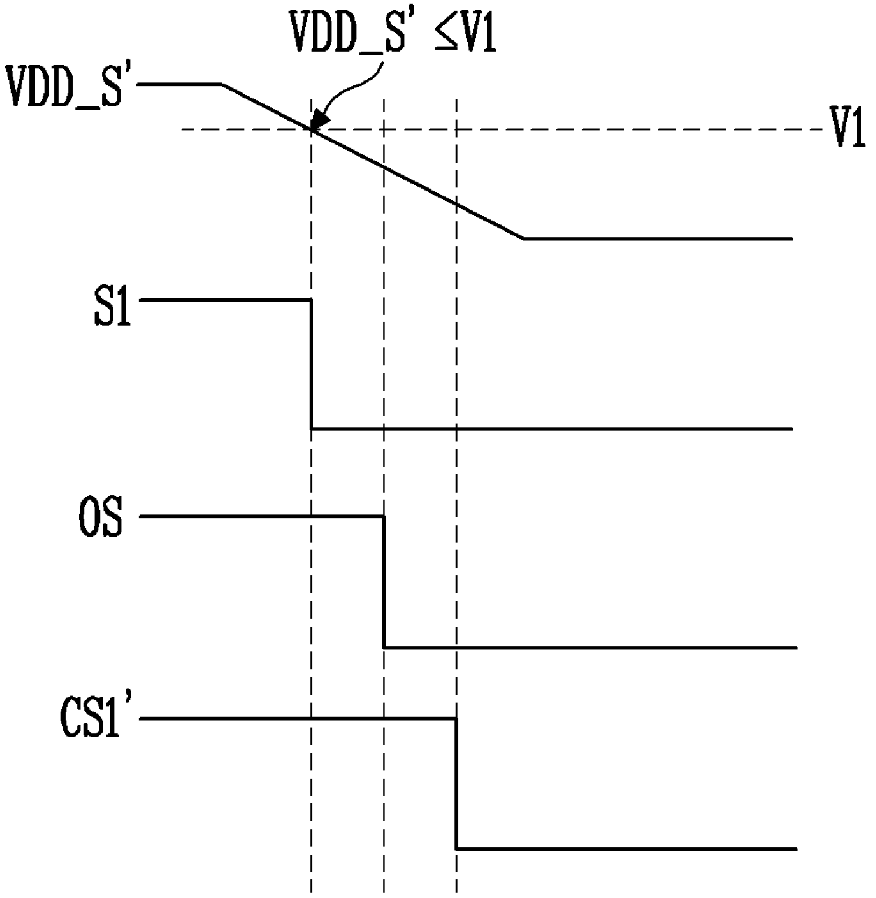
FIGS. 12A, 12B, and 12C are waveform diagrams illustrating operations of a first comparator and a second comparator, which are shown in FIG. 11.
Figure 12B:
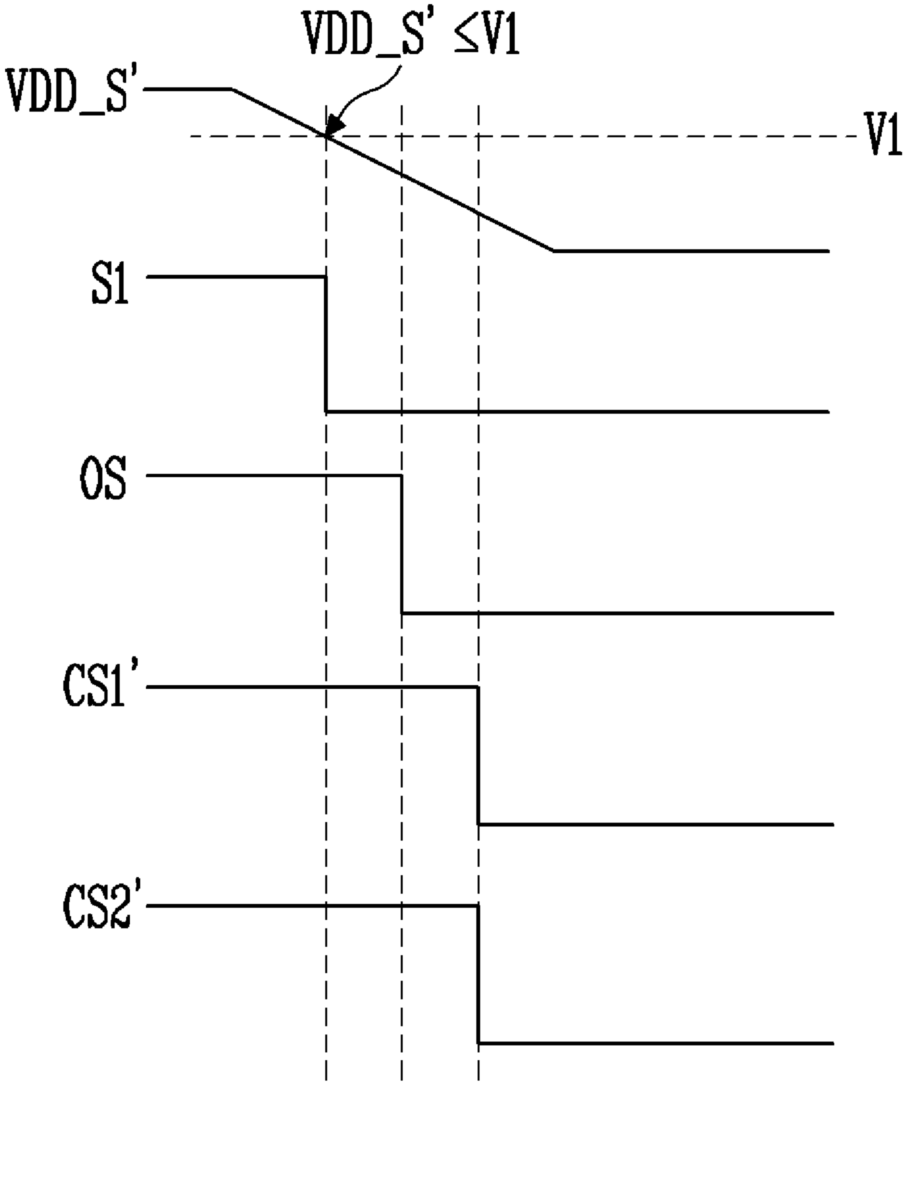
Figure 12C:
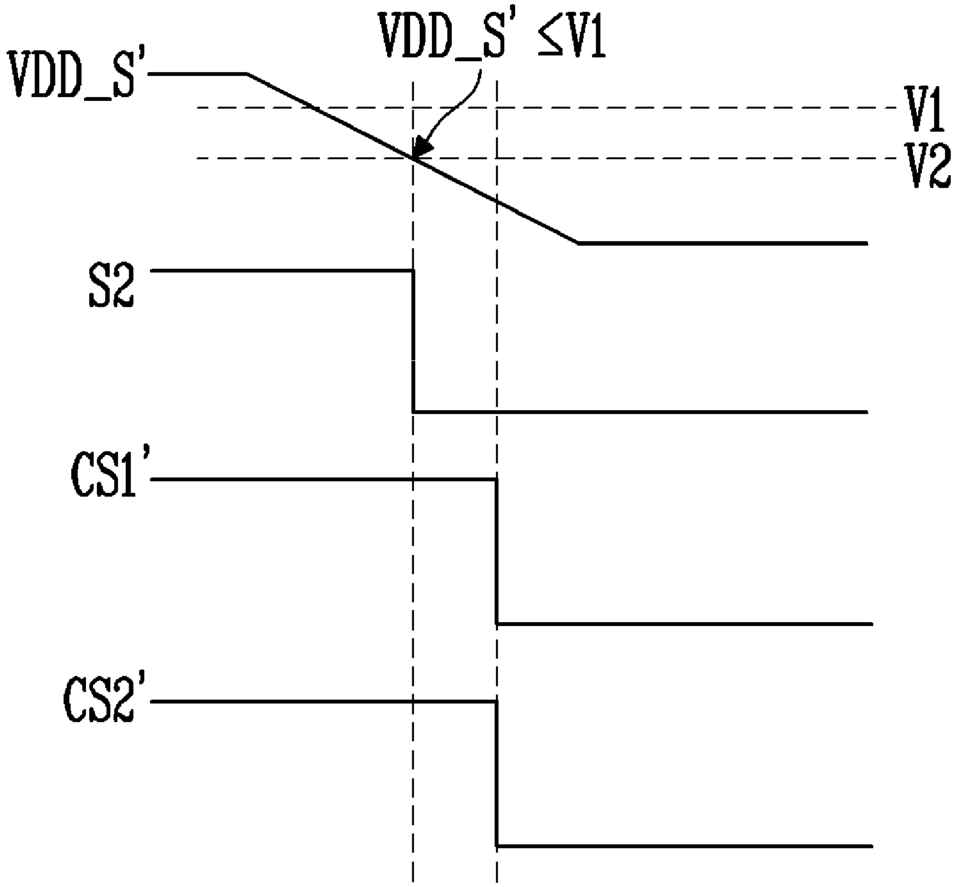

FIG. 11 is a diagram illustrating an example of the power voltage generator 400' included in the display device 2 shown in FIG. 10. FIGS. 12A to 12C are waveform diagrams illustrating operations of a first comparator and a second comparator, which are shown in FIG. 11.

Referring to FIG. 11, the power voltage generator 400' may include a plurality of comparators which generate an input voltage sensing value VDD_S' by sensing an input voltage VDD, and respectively control operations of the power voltage generator 400, the input voltage generator 500, and the timing controller 700' according to the input voltage sensing value VDD_S'. The input voltage sensing value VDD_S' may be the same voltage as the input voltage VDD.

In an embodiment, the power voltage generator 400' may include a first comparator for controlling an operation of the input voltage generator 500' when the input voltage sensing value VDD_S' is equal to or lower than a first voltage V1.

Referring to FIGS. 10, 11, and 12A, when the input voltage sensing value VDD_S' is equal to or lower than the first voltage V1, the first comparator may supply a first signal S1 having a low level to the input voltage generator 500'. The input voltage generator 500' may supply an off-signal OS having the low level to the timing controller 700, corresponding to the first signal S1 having the low level. The timing controller 700' may supply a 1'th control signal CS1' having the low level to the driving voltage generator 600, corresponding to the off-signal OS having the low level. The driving voltage generator 600 may be turned off corresponding to the 1'th control signal CS1' having the low level, and accordingly, the driving voltage ELVDD may not be supplied to the display panel 100. Thus, the display panel 100 is turned off, so that heat generation due to a drop of the input voltage VDD can be effectively prevented.

In addition, referring to FIGS. 10, 11, and 12B, when the input voltage sensing value VDD_S' is equal to or lower than the first voltage V1, the timing controller 700' may further supply a 2'th control signal CS2' having the low level to the power voltage generator 400', corresponding to the off-signal OS having the low level. The power voltage generator 400' may be turned off corresponding to the 2'th control signal CS2' having the low level, and accordingly, the power voltage may not be supplied to the scan driver 200, the data driver 300, the driving voltage generator 600, the timing controller 700' and the like, including the display panel 100. Thus, the scan driver 200, the data driver 300, the driving voltage generator 600, the timing controller 700' and the like, including the display panel 100 are turned off, so that the heat generation due to the drop of the input voltage VDD can be more effectively prevented.

In an embodiment, the power voltage generator 400' may include a second comparator for controlling an operation of the timing controller 700' when the input voltage sensing value VDD_S' is equal to or lower than a second voltage V2.

Referring to FIGS. 10, 11, and 12C, when the input voltage sensing value VDD_S' is equal to or lower than the second voltage V2, the second comparator may supply a second signal S2 to the timing controller 700'. The timing controller 700' may supply the 1'th control signal CS1' having the low level to the driving voltage generator 600 and supply the 2'th control signal CS2' having the low level to the power voltage generator 400, corresponding to the second signal S2 having the low level. That is, when the input voltage sensing value VDD_S' is equal to or lower than the second voltage V2, the timing controller 700' rapidly controls the driving voltage generator 600 and the power voltage generator 400' by generating the 1'th control signal CS1' and the 2'th control signal CS2' regardless of the input voltage generator 500', e.g., regardless of the off-signal OS, and thus an excessive drop of the input voltage VDD can be effectively prevented.

The driving voltage generator 600 may be turned off corresponding to the 1'th control signal CS1' having the low level, accordingly, the driving voltage ELVDD may not be supplied to the display panel 100. In addition, the power voltage generator 400' may be turned off corresponding to the 2'th control signal CS2' having the low level, and accordingly, the power voltage may not be supplied to the scan driver 200, the data driver 300, the driving voltage generator 600, the timing controller 700' and the like, including the display panel 100. Thus, the scan driver 200, the data driver 300, the driving voltage generator 600, the timing controller 700' and the like, including the display panel 100 are turned off, so that the heat generation due to the excessive drop of the input voltage VDD can be effectively prevented.

In an embodiment, the power voltage generator 400' may include a third comparator for controlling an operation of the power voltage generator 400' when the input voltage sensing value VDD_S' is equal to or higher than a third voltage V3.

Referring to FIG. 11, when the input voltage sensing value VDD_S' is equal to or higher than the third voltage V3, the third comparator may autonomously turn off the power voltage generator 400'. For example, the third comparator may include an over current protection (OVP) circuit, to turn off the power voltage generator 400' when the input voltage sensing value VDD_S' is equal to or higher than the third voltage V3, thereby preventing damage caused by over-current.

In an embodiment, the first voltage V1 may be set to a voltage level higher than a voltage level of the second voltage V2 or the second voltage V2 may be set to a voltage level lower than a voltage level of the first voltage V1, and be set to a voltage level lower than a voltage level of the third voltage V3. That is, the second voltage V2, the first voltage V1, and the third voltage V3 may be set to voltage levels which sequentially become high, and accordingly, the third voltage V3 may be set to a voltage level higher than voltage levels of the first voltage V1 and the second voltage V2. For example, the second voltage V2 may be set to 24V, the first voltage V1 may be set to 27V, and the third voltage V3 may be set to 36V.

Figure 13:
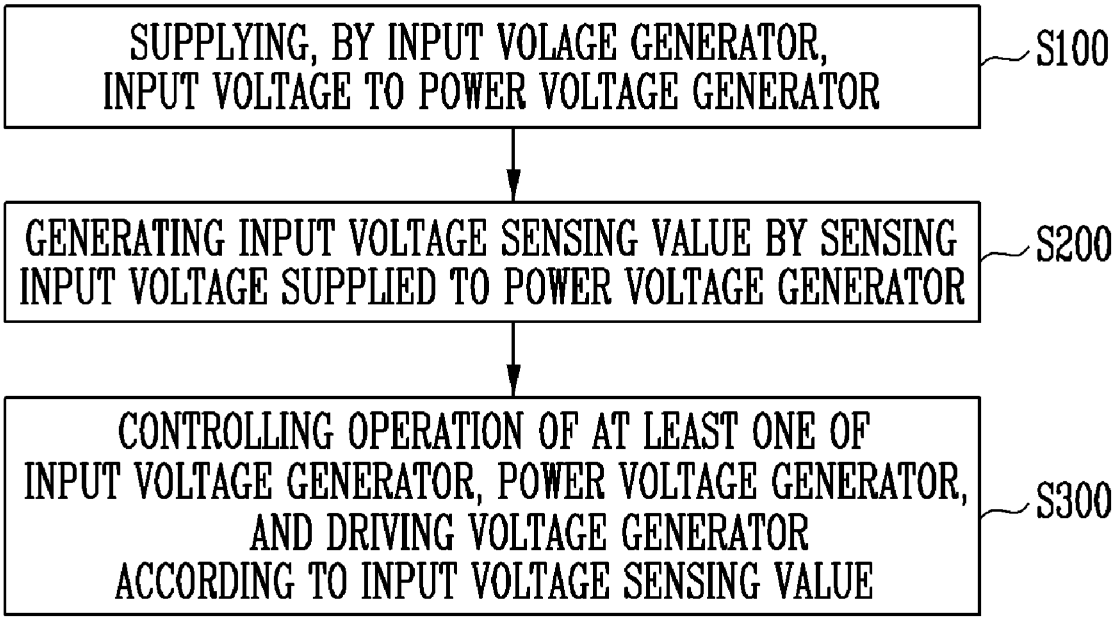
FIG. 13 is a diagram illustrating a driving method of a display device in accordance with an embodiment of the present disclosure.

FIG. 13 is a diagram illustrating a driving method of a display device in accordance with an embodiment of the present disclosure. The display device may include an input voltage generator, a power voltage generator, a driving voltage generator, and a timing controller.

Referring to FIG. 13, the driving method of the display device may include a supply operation S100 of supplying an input voltage to the power voltage generator, a sensing operation S200 of generating an input voltage sensing value by sensing the input voltage supplied to the power voltage generator, and a control operation S300 of controlling an operation of at least one of the input voltage generator, the power voltage generator, and the driving voltage generator according to the input voltage sensing value.

The supply operation S100 is an operation of supplying, by the input voltage generator, an input voltage VDD to the power voltage generator.

The sensing operation S200 is an operation of generating, by the power voltage generator, an input voltage sensing value VDD_S by sensing an input voltage VDD.

The control operation S300 is an operation of controlling, by the timing controller, an operation of at least one of the input voltage generator, the power voltage generator, and the driving voltage generator according to the input voltage sensing value VDD_S.

In an embodiment, when input voltage sensing value VDD_S is equal to or lower than a first voltage V1, the control operation S300 may include an operation of supplying, by the timing controller, a first control signal CS1 to the input voltage generator, an operation of supplying, by the input voltage generator, an off-signal OS to the timing controller, corresponding to the first control signal CS1, an operation of supplying, by the timing controller, a second control signal CS2 to the driving voltage generator, corresponding to the off-signal OS, and an operation of turning off the driving voltage generator, corresponding to the second control signal CS2, e.g., see FIG. 5.

In an embodiment, the control operation S300 may further include an operation of supplying, by the timing controller, a third control signal CS3 to the power voltage generator, corresponding to the off-signal OS and an operation of turning off the power voltage generator, corresponding to the third control signal CS3, e.g., see FIG. 7.

In an embodiment, when the input voltage sensing value VDD_S is equal to or lower than a second voltage, the control operation S300 may include an operation of supplying, by the timing controller, the second control signal CS2 and the third control signal CS3 respectively to the driving voltage generator and the power voltage generator and an operation of turning off the driving voltage generator and the power voltage generator, respectively corresponding to the second control signal CS2 and the third control signal CS3, e.g., see FIG. 9.

In an embodiment, when an input voltage sensing value is equal to or lower than a first voltage V1, the control operation S300 may include an operation of supplying, by the power voltage generator, a first signal S1 to the input voltage generator, an operation of supplying, by the input voltage generator, an off signal to the timing controller, corresponding to the first signal S1, an operation of supplying, by the timing controller, a 1'th control signal CS1' to the driving voltage generator, corresponding to the off-signal OS, and an operation of turning off the driving voltage generator, corresponding to the 1'th control signal CS1, e.g., see FIG. 12A.

In an embodiment, the control operation S300 may further include an operation of supplying, by the timing controller, a 2'th control signal CS2' to the power voltage generator, corresponding to the off-signal OS and an operation of turning off the power voltage generator, corresponding to the 2'th control signal CS2', e.g., see FIG. 12B.

In an embodiment, when the input voltage sensing value is equal to or lower than a second voltage V2, the control operation S300 may include an operation of supplying, by the power voltage generator, a second signal S2 to the timing controller, an operation of supplying, by the timing controller, the 1'th control signal CS1' and the 2'th control signal CS2' respectively to the driving voltage generator and the power voltage generator, corresponding to the second signal S2, and an operation of turning off the driving voltage generator and the power voltage generator, respectively corresponding to the 1'th control signal CS1' and the 2'th control signal CS2', e.g., see FIG. 12C.

In an embodiment, when the input sensing value is equal to or higher than a third voltage V3, the control operation S300 may include an operation of turning off the power voltage generator.

In an embodiment, the first voltage V1 may be set to a voltage level higher than a voltage level of the second voltage V2 or the second voltage V2 may be set to a voltage level lower than a voltage level of the first voltage V1. Further, the first voltage V1 may be set to a voltage level lower than a voltage level of the third voltage V3. That is, the second voltage V2, the first voltage V1, and the third voltage V3 may be set to voltage levels which sequentially become high, and accordingly, the third voltage V3 may be set to a voltage level higher than voltage levels of the first voltage V1 and the second voltage V2. For example, the second voltage V2 may be set to 24V, the first voltage V1 may be set to 27V, and the third voltage V3 may be set to 36V.

In accordance with the present disclosure, an input voltage is sensed, thereby sensing a change in the input voltage, and an operation of each of the driving voltage controller, the power voltage generator, and the like is controlled, thereby preventing a drop of the input voltage.

In addition, an excessive increase in input current is suppressed by preventing the drop of the input voltage, so that heat generation of the display panel can be prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a display panel provided with a pixel configured to emit light by using a driving voltage;

a driving voltage generator configured to supply the driving voltage to the pixel;

a power voltage generator configured to generate power voltages for driving of the display panel by using an input voltage, and generate an input voltage sensing value by sensing the input voltage;

an input voltage generator configured to supply the input voltage to the power voltage generator; and a timing controller configured to control an operation of at least one of the driving voltage generator, the power voltage generator, and the input voltage generator according to the input voltage sensing value, wherein the power voltage generator is configured to sense the input voltage in at least one frame unit.

2. The display device of claim 1, wherein, when the input voltage sensing value is equal to or lower than a first voltage, the timing controller is configured to supply a first control signal to the input voltage generator, and wherein the input voltage generator is configured to supply an off-signal to the timing controller, corresponding to the first control signal.

3. The display device of claim 2, wherein the timing controller is configured to supply a second control signal to the driving voltage generator, corresponding to the off-signal, and wherein the driving voltage generator is turned off corresponding to the second control signal.

4. The display device of claim 3, wherein the timing controller is further configured to supply a third control signal to the power voltage generator, corresponding to the off-signal, and wherein the power voltage generator is turned off corresponding to the third control signal.

5. The display device of claim 1, wherein, when the input voltage sensing value is equal to or lower than a second voltage lower than a first voltage, the timing controller is configured to supply a second control signal to the driving voltage generator and supply a third control signal to the power voltage generator, and wherein the driving voltage generator is turned off corresponding to the second control signal, and the power voltage generator is turned off corresponding to the third control signal.

6. A display device comprising:

a display panel provided with a pixel configured to emit light by using a driving voltage;

a driving voltage generator configured to supply the driving voltage to the pixel;

a power voltage generator configured to generate power voltages for driving of the display panel by using an input voltage, generate an input voltage sensing value by sensing the input voltage, and generate a first signal or a second signal according to the input voltage sensing value;

an input voltage generator configured to supply the input voltage to the power voltage generator; and a timing controller configured to control an operation of at least one of the driving voltage generator, the power voltage generator, and the input voltage generator, wherein the power voltage generator includes:

a first comparator configured to generate the first signal and supply the first signal to the input voltage generator when the input voltage sensing value is equal to or lower than a first voltage; and a second comparator configured to generate the second signal and supply the second signal to the timing controller, when the input voltage sensing value is equal to or lower than a second voltage lower than the first voltage.

7. The display device of claim 6, wherein the input voltage generator is configured to supply an off-signal to the timing controller, corresponding to the first signal, wherein the timing controller is configured to supply a 1'th control signal to the driving voltage generator, corresponding to the off-signal, and wherein the driving voltage generator is turned off corresponding to the 1'th control signal.

8. The display device of claim 7, wherein the timing controller is further configured to supply a 2'th control signal to the power voltage generator, corresponding to the off-signal, and wherein the power voltage generator is turned off corresponding to the 2'th control signal.

9. The display device of claim 6, wherein the timing controller is configured to supply a 1'th control signal to the driving voltage generator and supply a 2'th control signal to the power voltage generator, corresponding to the second signal, and wherein the driving voltage controller is turned off corresponding to the 1'th control signal, and the power voltage generator is turned off corresponding to the 2'th control signal.

10. The display device of claim 6, wherein the power voltage generator further includes a third comparator configured to turn off the power voltage generator when the input voltage sensing value is equal to or higher than a third voltage.

11. A method of driving a display device, the method comprising:

supplying, by an input voltage generator, an input voltage to a power voltage generator;

generating an input voltage sensing value by sensing the input voltage supplied to the power voltage generator; and controlling an operation of at least one of the input voltage generator, the power voltage generator, and a driving voltage generator according to the input voltage sensing value, wherein the controlling includes:

when the input voltage sensing value is equal to or higher than a third voltage, turning off the power voltage generator.

12. The method of claim 11, wherein the controlling includes:

when the input voltage sensing value is equal to or lower than a first voltage, supplying, by a timing controller, a first control signal to the input voltage generator;

supplying, by the input voltage generator, an off-signal to the timing controller, corresponding to the first control signal;

supplying, by the timing controller, a second control signal to the driving voltage generator, corresponding to the off-signal; and turning off the driving voltage generator, corresponding to the second control signal.

13. The method of claim 12, wherein the controlling further includes:

supplying, by the timing controller, a third control signal to the power voltage generator, corresponding to the off-signal; and turning off the power voltage generator, corresponding to the third control signal.

14. The method of claim 11, wherein the controlling includes:

when the input voltage sensing value is equal to or lower than a second voltage lower than a first voltage, supplying, by a timing controller, a second control signal and a third control signal respectively to the driving voltage generator and the power voltage generator; and turning off the driving voltage generator and the power voltage generator, respectively corresponding to the second control signal and the third control signal.

15. The method of claim 11, wherein the controlling includes:

when the input voltage sensing value is equal to or lower than a first voltage, supplying, by the power voltage generator, a first signal to the input voltage generator;

supplying, by the input voltage generator, an off-signal to a timing controller, corresponding to the first signal;

supplying, by the timing controller, a 1'th control signal to the driving voltage generator, corresponding to the off-signal; and turning off the driving voltage generator, corresponding to the 1'th control signal.

16. The method of claim 15, wherein the controlling further includes:

supplying, by the timing controller, a 2'th control signal to the power voltage generator, corresponding to the off-signal; and turning off the power voltage generator, corresponding to the 2'th control signal.

17. The method of claim 11, wherein the controlling includes:

when the input voltage sensing value is equal to or lower than a second voltage lower than a first voltage, supplying, by the power voltage generator, a second signal to a timing controller;

supplying, by the timing controller, a 1'th control signal and a 2'th control signal respectively to the driving voltage generator and the power voltage generator, corresponding to the second signal; and turning off the driving voltage generator and the power voltage generator, respectively corresponding to the 1'th control signal and the 2'th control signal.

18. An electronic device comprising:

a driving voltage generator configured to supply a driving voltage to a pixel;

a power voltage generator configured to generate power voltages for driving of a display panel by using an input voltage, and generate an input voltage sensing value by sensing the input voltage;

an input voltage generator; and a timing controller configured to control an operation of at least one of the driving voltage generator, the power voltage generator, and the input voltage generator, the input voltage generator being configured to supply the input voltage to the power voltage generator according to the input voltage sensing value, wherein the power voltage generator is configured to sense the input voltage in at least one frame unit.

19. The electronic device of claim 18, wherein, when the input voltage sensing value is equal to or lower than a first voltage, the timing controller is configured to supply a first control signal to the input voltage generator, and wherein the input voltage generator is configured to supply an off-signal to the timing controller, corresponding to the first control signal.

20. The electronic device of claim 19, wherein the timing controller is configured to supply a second control signal to the driving voltage generator, corresponding to the off-signal, and wherein the driving voltage generator is turned off corresponding to the second control signal.

21. The electronic device of claim 20, wherein the timing controller is further configured to supply a third control signal to the power voltage generator, corresponding to the off-signal, and wherein the power voltage generator is turned off corresponding to the third control signal.

22. The electronic device of claim 18, wherein, when the input voltage sensing value is equal to or lower than a second voltage lower than a first voltage, the timing controller is configured to supply a second control signal to the driving voltage generator and supply a third control signal to the power voltage generator, and wherein the driving voltage generator is turned off corresponding to the second control signal, and the power voltage generator is turned off corresponding to the third control signal.

23. An electronic device comprising:

a driving voltage generator configured to supply a driving voltage to a pixel;

a power voltage generator configured to generate power voltages necessary for driving of a display panel by using an input voltage, generate an input voltage sensing value by sensing the input voltage, and generate a first signal or a second signal according to the input voltage sensing value;

an input voltage generator; and a timing controller configured to control an operation of at least one of the driving voltage generator, the power voltage generator, and the input voltage generator, the input voltage generator being configured to supply the input voltage to the power voltage generator, wherein the power voltage generator includes:

a first comparator configured to generate the first signal and supply the first signal to the input voltage generator when the input voltage sensing value is equal to or lower than a first voltage; and a second comparator configured to generate the second signal and supply the second signal to the timing controller, when the input voltage sensing value is equal to or lower than a second voltage lower than the first voltage.

24. The electronic device of claim 23, wherein the input voltage generator is configured to supply an off-signal to the timing controller, corresponding to the first signal, wherein the timing controller is configured to supply a 1'th control signal to the driving voltage generator, corresponding to the off-signal, and wherein the driving voltage generator is turned off corresponding to the 1'th control signal.

25. The electronic device of claim 24, wherein the timing controller is further configured to supply a 2'th control signal to the power voltage generator, corresponding to the off-signal, and wherein the power voltage generator is turned off corresponding to the 2'th control signal.

26. The electronic device of claim 23, wherein the timing controller is configured to supply a 1'th control signal to the driving voltage generator and supply a 2'th control signal to the power voltage generator, corresponding to the second signal, and wherein the driving voltage controller is turned off corresponding to the 1'th control signal, and the power voltage generator is turned off corresponding to the 2'th control signal.

27. The electronic device of claim 23, wherein the power voltage generator further includes a third comparator configured to turn off the power voltage generator when the input voltage sensing value is equal to or higher than a third voltage.

* * * * *